US012057986B2

(12) United States Patent
Yablonka et al.

(10) Patent No.: US 12,057,986 B2
(45) Date of Patent: Aug. 6, 2024

(54) SYSTEM AND METHOD FOR USING LOW COMPLEXITY MAXIMUM LIKELIHOOD DECODER IN A MIMO DECODER

(71) Applicant: Ceva D.S.P. Ltd., Herzlia Pituach (IL)

(72) Inventors: Tomer Yablonka, Tel Aviv (IL); Guy Keshet, Petah Tikva (IL); Zeev Kaplan, Rosh Ha-ayin (IL)

(73) Assignee: CEVA TECHNOLOGIES, LTD, Herzlia Pituach (IL)

( * ) Notice: Subject to any disclaimer, the term of this patent is extended or adjusted under 35 U.S.C. 154(b) by 305 days.

(21) Appl. No.: 17/679,944

(22) Filed: Feb. 24, 2022

(65) Prior Publication Data

US 2023/0269124 A1  Aug. 24, 2023

(51) Int. Cl.
*H04W 4/00* (2018.01)
*H04L 1/00* (2006.01)
(Continued)

(52) U.S. Cl.
CPC ........ *H04L 27/3405* (2013.01); *H04L 1/0054* (2013.01); *H04L 25/061* (2013.01)

(58) Field of Classification Search
CPC . H04L 27/3405; H04L 1/0054; H04L 25/061; H04L 25/0246; H04L 27/34; H04L 25/03993; H04L 27/06; H04B 7/08
See application file for complete search history.

(56) References Cited

U.S. PATENT DOCUMENTS 7,912,140 B2   3/2011  Anholt et al.
7,965,782 B1   6/2011  Vijayan et al.
(Continued)

FOREIGN PATENT DOCUMENTS

CN   103 188 703   7/2013
CN   103 237 002   11/2016
(Continued)

OTHER PUBLICATIONS

Peng Liang et al: "The low complexity deterministic SMC detection algorithm for MIMO system", Wireless Communications, Networking and Mobile Computing, 2005. Proceedings. 2005 International Conference on Wuhan, China Sep. 23-26, 2005, Piscataway, NJ, USA, IEEE, vol. 1, Sep. 23, 2005, pp. 48-51, XP010856083, DCI: 10.1109/WCNM. 2005. 1543980 ISBN: 978-0-7803-9335-6, Chapter B, p. 50.

(Continued)

*Primary Examiner* — Atique Ahmed
(74) *Attorney, Agent, or Firm* — PEARL COHEN ZEDEK LATZER BARATZ LLP

(57) ABSTRACT

A method and system for performing quadrature amplitude modulation (QAM) decoding of a received signal includes finding for each layer a region in a first constellation diagram of the received signal, the region including a portion of the first constellation diagram, the portion having the same size of a second constellation diagram, and a first constellation order of the received signal is higher than a second constellation order of the second constellation diagram; and, for each layer: finding a first portion of bits based on bits that are constant among constellation points located in the region of the layer; decoding the received signal using a QAM decoder having the second constellation order to obtain a second portion of bits; adjusting the second portion of bits based on the region of the layer; and merging the first portion of bits with the second portion of bits to obtain a decoded symbol.

20 Claims, 11 Drawing Sheets

(51) Int. Cl.
H04L 25/06 (2006.01)
H04L 27/34 (2006.01)

(56) References Cited

U.S. PATENT DOCUMENTS

| | | | |
|---|---|---|---|
| 8,665,977 B2 | 3/2014 | Cheng et al. | |
| 9,008,241 B1 | 4/2015 | Tong | |
| 9,654,252 B2 | 5/2017 | Dhayni et al. | |
| 10,530,629 B2* | 1/2020 | Barsoum | G06T 7/33 |
| 10,547,487 B1* | 1/2020 | Zhang | H04L 27/3411 |
| 2006/0085727 A1* | 4/2006 | Azenkot | H04L 27/34 |
| | | | 714/792 |
| 2008/0025323 A1* | 1/2008 | Khan | H04L 27/3488 |
| | | | 370/400 |
| 2015/0256376 A1* | 9/2015 | Limberg | H04L 1/08 |
| | | | 375/261 |
| 2019/0238379 A1* | 8/2019 | Walk | H04L 27/2627 |
| 2019/0342772 A1* | 11/2019 | Barsoum | H04L 1/0003 |
| 2020/0028725 A1* | 1/2020 | Limberg | H04L 25/067 |
| 2021/0243064 A1* | 8/2021 | Limberg | H04L 27/2697 |

FOREIGN PATENT DOCUMENTS

| | | |
|---|---|---|
| EP | 1 592 191 | 11/2005 |
| EP | 2 704 384 | 3/2014 |
| EP | 2804332 | 11/2014 |

OTHER PUBLICATIONS

European Search Report of Application No. 23158352.7 mailed on Jun. 26, 2023.

* cited by examiner

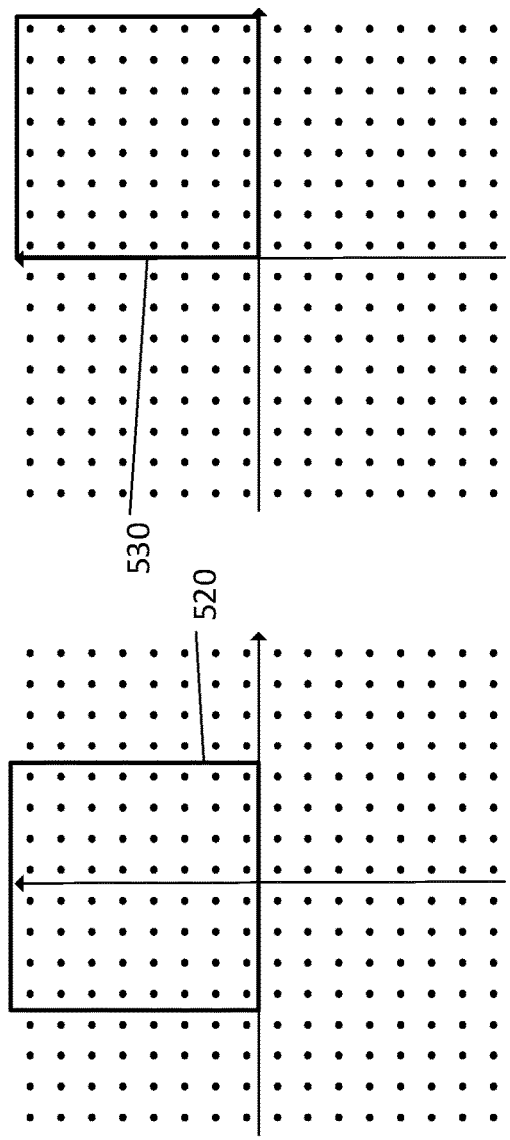
Fig. 5A
Fig. 5B
Fig. 5C
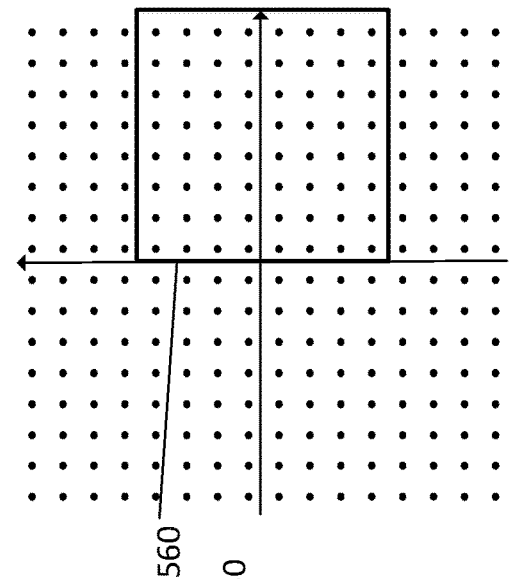
Fig. 5D
Fig. 5E
Fig. 5F

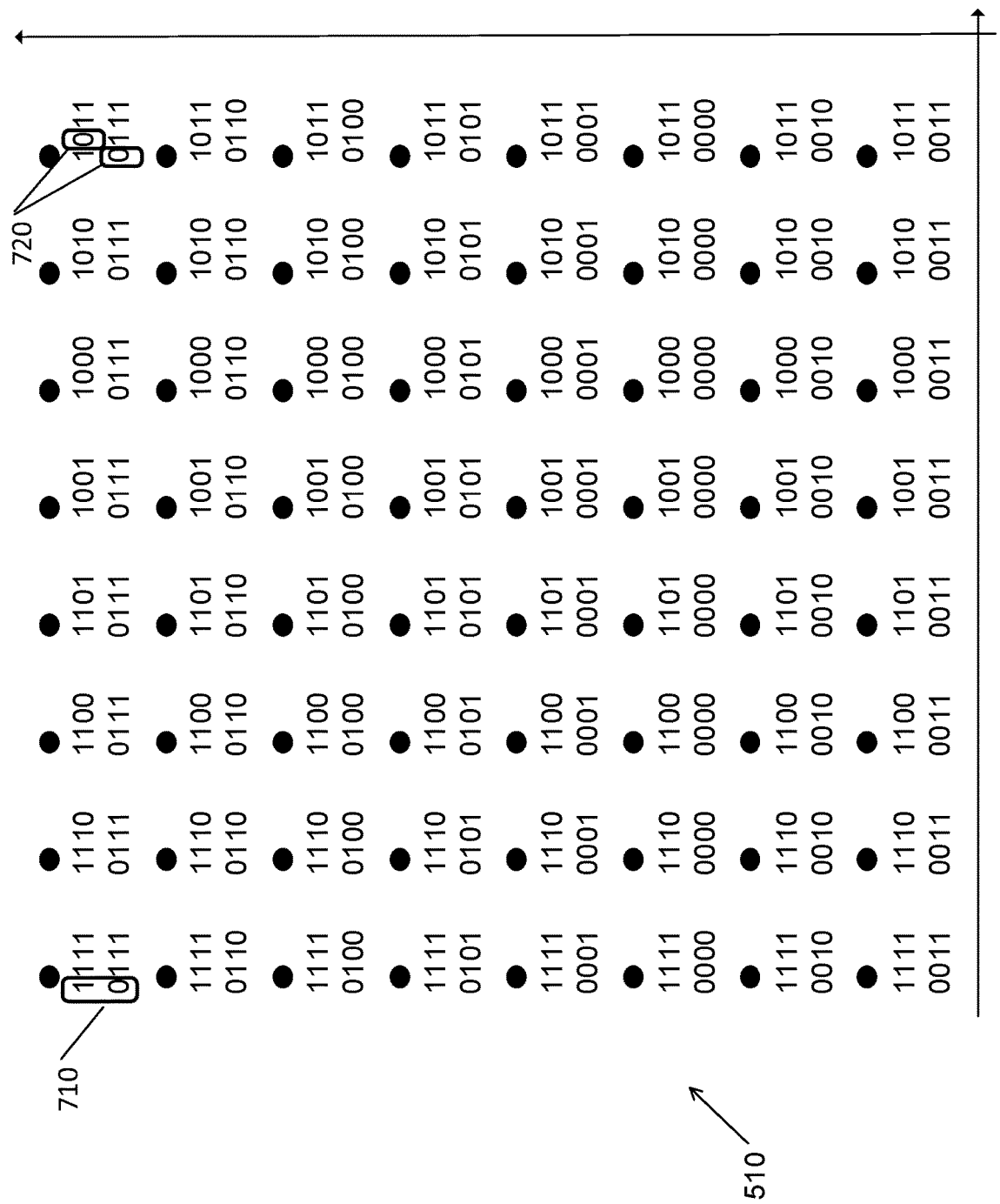

SYSTEM AND METHOD FOR USING LOW COMPLEXITY MAXIMUM LIKELIHOOD DECODER IN A MIMO DECODER

FIELD OF THE INVENTION

Embodiments of the present invention relate generally to the field of radio frequency (RF) multiple-input-multiple-output (MIMO) systems and more particularly to using a low complexity maximum likelihood decoder (MLD) in a decoder of such systems.

BACKGROUND OF THE INVENTION

A MIMO receiver may include receiving antennas that receive radio signals and an estimation section that may find channel estimation of the recovered radio signals. In order to demodulate the signal, one of the approaches is to use MLD.

The complexity of MLD calculations is very high and increases as the MIMO order and/or constellation order increases. For example, decoding a received signal using full MLD for L layers MIMO and m constellation order, where $m=2^n$ requires $2^{(n*L)}$ calculations. Thus, for example, for 4×4 MIMO and 256 quadrature amplitude modulation (QAM) constellation, $2^{8*4}=2^{32}$ calculations are required, and for 64 QAM constellation and 4×4 MIMO $2^{6*4}=2^{24}$ calculations are required.

Due to the enormous rate at which information may be decoded, there is a great need in the art for providing a system and method that manages decoding signals in MIMO systems at an acceptable complexity while maintaining performance.

SUMMARY OF THE INVENTION

According to embodiments of the invention, a system and method for performing a quadrature amplitude modulation (QAM) decoding of a received signal may include, using a processor: for each layer of a received signal, finding a region in a first constellation diagram of the received signal, where the region may include a portion of the first constellation diagram of the received signal, where the portion may have the same size of a second constellation diagram, and where a first constellation order of the received signal may be higher than a second constellation order of the second constellation diagram; and, for each layer: finding a first portion of bits of a decoded symbol based on bits that are constant among constellation points located in the region of the layer; decoding the received signal using a QAM decoder having the second constellation order to obtain a second portion of bits of the decoded symbol; adjusting the second portion of bits based on the region of the layer; and merging the first portion of bits with the second portion of bits.

According to embodiments of the invention, the QAM decoder may be a maximum likelihood decoder (MLD).

Embodiments of the invention may include, prior to the decoding, offsetting the received signal, wherein the offset is determined based on the region.

According to embodiments of the invention, finding the region may include performing hard decoding on the received signal based on the received signal and a channel matrix.

According to embodiments of the invention, finding the region may include performing sorted QR decomposition of a channel matrix; solving a channel equation using a sorted R matrix of the sorted QR decomposition; selecting a closest constellation point for each layer; and selecting the region based on the closest constellation point.

Embodiments of the invention may include, prior to the decoding, adjusting the received signal by a multiplication of the sorted R matrix and a region offset determined based on the region.

According to embodiments of the invention, the first portion of bits may include log likelihood ratios (LLRs) of the first portion of bits and the second portion of bits may include LLRs of the second portion bits.

According to embodiments of the invention, the first constellation order may be 256 and the constellation order may be 64.

According to embodiments of the invention, a constellation diagram of the received signal may be divided into nine overlapping squared regions of 8*8 constellation points.

According to embodiments of the invention, a system and method for decoding an input signal modulated using quadrature amplitude modulation (QAM) having a first modulation order, by a QAM maximum likelihood decoder (MLD) having a second modulation order, the method may include: dividing a constellation diagram of the input signal into regions equal in size to the size of a constellation diagram of the QAM MLD, where the first modulation order may be higher than the second modulation order, where the regions when combined may cover the entire constellation diagram of the input signal, and where at least a portion of decoded bits may be constant over each region; performing sorted QR decomposition on a channel matrix; solving a channel equation using an R matrix of the QR decomposition to find a region for each layer; and for each layer: selecting bits that are constant for all constellation points in the region of the layer; offsetting the received signal based on the region of the layer; determining the remaining bits using the QAM MLD; adjusting the remaining bits based on the region of the layer; and merging the bits that are constant with the adjusted bits.

According to some embodiments, the regions may overlap.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIGS. 5A-5I are schematic illustrations of an example regions in the size of a 64 QAM constellation map on a 256 QAM constellation map, according to embodiments of the invention;

FIG. 7 presents bit values that are assigned to each constellation point in a first region in a typical 256 QAM constellation, and the hard decoded bits in that region, according to embodiments of the invention;

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

Figure 1:
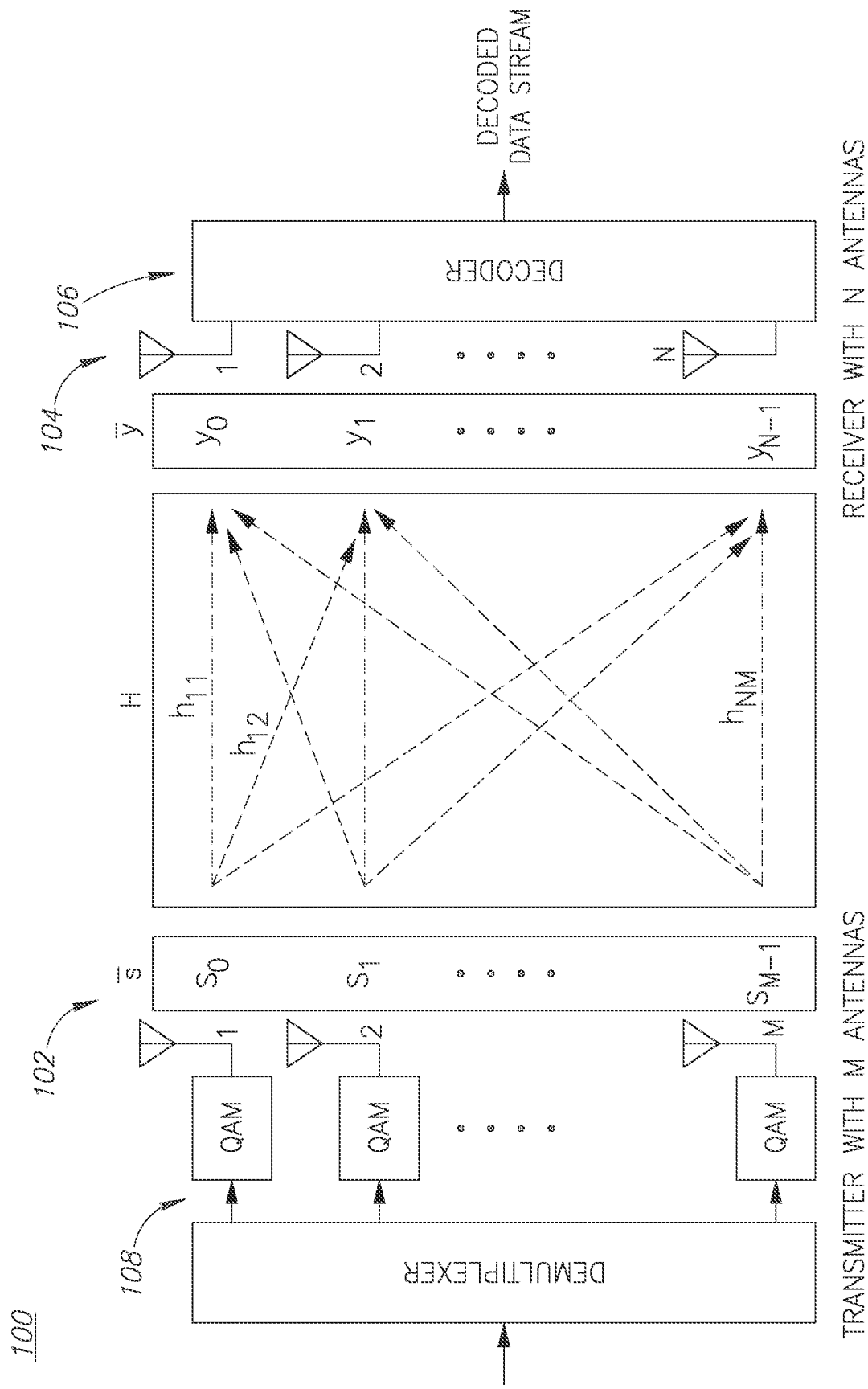
FIG. 1 is a schematic illustration of a N×M MIMO system, according to embodiments of the invention.

Reference is now made to FIG. 1 depicting an N×M MIMO system 100, according to embodiments of the invention. Embodiments of the present invention may apply to various MIMO systems including long-term evolution (LTE), fifth generation new radio (5G NR) and Wi-Fi MIMO communication networks. According to embodiments of the invention, N×M MIMO system 100 may include multiple M transmitting antennas 102 sending signals to multiple N receiving antennas 104. The M transmit antennas 102 may transmit, over a channel, data streams, called layers, represented by a transmit vector s. As used herein a vector may refer to a matrix where one of the dimensions is one. Each data stream or layer in transmit vector s may be modulated, e.g., using quadrature amplitude modulation (QAM) of a selected order. For example, each layer in transmit vector s may be modulated using 16 QAM, 64 QAM and 256 QAM, etc. QAM modulation may enable a single radio wave (e.g., symbol in transmit vector s) to represent a plurality of binary bits of data (e.g., a bit sequence) by manipulating the amplitude and phase of the radio wave into one of a plurality of different discrete states.

As used herein, a constellation order m may refer to the number of constellation points in the constellation map (also referred to the constellation diagram), and each point in the constellation map may represent a binary bit sequence, including a number n of binary bits of information, referred to herein simply as bits, where $m=2^n$. Thus, for a constellation order m, the number of bits in the bit sequence of a single symbol may equal n, where $m=2^n$. For example, for 256 QAM, the constellation order is 256 the constellation map includes 256 constellation points, and the number of bits per symbol is eight. Thus, a single symbol modulated using 16 QAM may represent 4 bits of data, a single symbol modulated using 64 QAM may represent 6 bits of data, and a single symbol modulated using 256 QAM may represent 8 bits of data.

Receiving antennas 104 may receive data samples represented by a received signal or sample Y. The relationship between the transmitted vector s and the received signal Y may be defined in a signal model as in the following example equation:

$$Y=Hs+n \qquad \text{(Equation 1)}$$

Where H is a channel estimation matrix, also referred to as the channel matrix. The channel matrix H may include entries $h_{ij}$ that represent the relationship between the signals transmitted from the $j^{th}$ transmitter antenna 102 to the signal received by the $i^{th}$ receiver antenna 104. The dimension of the transmit vector s is M×1, the dimension of the received signal y is N×1, the dimension of the channel matrix H is N×M and n is a signal noise vector of dimension N×1 with an example correlation matrix $R_{nn}$:

$$R_{nn}=\Sigma n^* n^H \qquad \text{(Equation 2)}$$

A MIMO decoder 106, e.g., configured to perform a higher-order QAM decoding using a lower order QAM decoder, may decode a received signal Y by determining its corresponding transmit signal s for a given channel matrix H. Each vector s may be a vector with a number of elements equal to the number of transmit antennas 102 (or layers), M, and each vector y may be a vector with a number of elements equal to the number of receive antennas 104, N. In one example of a 4×4 MIMO channel matrix H (N=M=4), each vector s and Y may be a 4-vector with 4 elements.

A demultiplexer 108 may modulate transmitted signals s, for example, using QAM mappers with modulation order of 4, 16, 64 or 256 QAM or any other squared QAM modulation. Modulation order may define the number of possible or candidate values for each vector element. For example, each element in 4 QAM (e.g., QAM with modulation order of four) or quadrature phase-shift keying (QPSK) has 4 possible values (e.g. defined by 2 bits—$2^2=4$ complex values (1, 1), (−1, 1), (−1, −1), (1, −1)), each element in 64 QAM (e.g., QAM with modulation order of 64) has 64 possible values (e.g. 6 bits), each element in 256 QAM (e.g., QAM with modulation order of 256) has 256 possible values (e.g. 8 bits), etc.

In some prior art systems, a maximum likelihood (ML) decoder may have to evaluate a total number of different transmit vectors s equal to the number of possible candidate modulation values to the power of the number of transmit antennas M to find the most likely solution for each received signal Y For example, 64 QAM, using 4×4 MIMO there are $64^4$ (16.8 million) different candidate 4-vectors s. A maximum likelihood (ML) decoder may, for example, search a tree graph to determine the most likely solution e.g., a node in the tree graph representing one element in a transmit vector s associated with a minimum difference or distance in equation (1) between H·s and the received signal Y e.g., $\min_s \|y-H \cdot s\|^2$. However, computing such distances for the trillions of possible solutions per second supported by higher-order QAM in wireless communications standards, such as LTE advanced or 5G, is difficult.

According to embodiments of the invention, decoder 106 may utilize a lower-order QAM decoder for performing higher-order QAM decoding. For example, decoder 106 may use a 64 QAM decoder for decoding a 256 QAM signal. As used herein the constellation order may equal the number of constellation points in the constellation map, e.g., the number of possible values in a symbol for each layer. As used herein, higher-order QAM constellations may refer to squared QAM constellations with Gray coded constellation points, and constellation order of $m=4^q$, q being a positive integer q≥2, and lower-order QAM may refer to squared QAM constellations with Gray coded constellation points, and constellation order of $l=4^p$, p being a positive integer, and q>p≥1. For example, the higher-order QAM may be 256 QAM, and the lower-order QAM may be 64 QAM. The transmitted signals s (and hence the received signal Y) may be modulated by the higher-order QAM, and according to embodiments of the invention, decoder 106 may use a lower-order QAM decoder for decoding the received signal Y. Thus, if the transmitted signals s is modulated with 256 QAM, decoder 106 may use a 64 QAM decoder for decoding the received signal Y.

Thus, embodiments of the invention may reduce the complexity of higher-order QAM decoding, and reduce the power and area required in the processor for performing higher-order QAM decoding, with comparison to prior art. By utilizing a lower-order QAM decoder for performing higher-order QAM decoding, embodiments of the invention may improve the technology of MIMO systems, and more particularly may improve a decoder of such systems, allowing for improved telecommunications systems such as cellular telephone systems, Wi-Fi networks, and other computer data systems.

Figure 2:
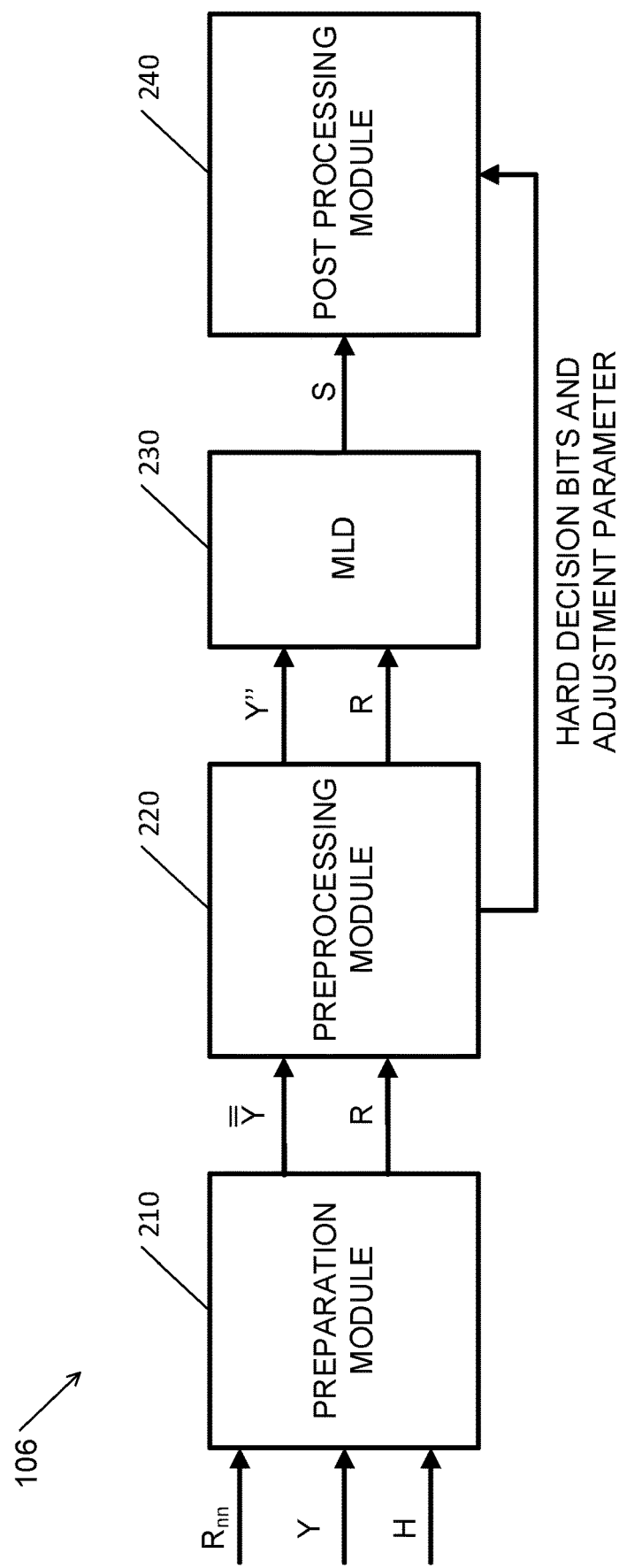
FIG. 2 is a schematic illustration of a simplified block diagram of MIMO decoder, according to embodiments of the invention.

Reference is now made to FIG. 2 which is a schematic illustration of a simplified block diagram of MIMO decoder 106, according to embodiments of the invention. According to embodiments of the invention, MIMO decoder 106 may include a preparation module 210, a preprocessing module 220, an MLD module 230 and a post processing module 240. Preparation module 210 may obtain the received signal Y, the channel matrix H, and the noise correlation matrix $R_{nn}$. Preparation module 210 may whiten the received signal Y and the channel matrix H, may perform a sorted QR decomposition to the whitened channel matrix H, and may calculate $\bar{Y}$ as disclosed herein.

Preprocessing module 220 may obtain the R matrix of the sorted QR decomposition and $\bar{Y}$. Preprocessing module 220 may choose, estimate or find a region in a higher-order QAM constellation diagram of the received signal Y for each layer of the received signal Y. The region may include a portion of the constellation diagram of the higher-order QAM in size of a constellation diagram of a lower-order QAM. Thus, the region may be squared with $l=4^p$ constellation order (p being a positive integer q>p≥1). For example, if the transmitted signal s is 256 QAM, the region may be in the size of a 64 QAM constellation map. Preprocessing module 220 may further find for each layer a first portion of bits (e.g., LLRs of the bits) of a decoded symbol based on bits that are constant among constellation points located in the region of the layer. Preprocessing module 220 may offset $\bar{Y}$ based on the region of the layer to obtain Y'. Preprocessing module 220 may provide Y' and the R matrix to the lower-order QAM MLD 230. Preprocessing module 220 may further provide an adjustment parameter for post processing module 240, as disclosed herein.

MLD 230 may decode the received signal to determine, calculate or estimate a second portion of bits (e.g., LLRs of the bits) of the decoded symbol. Post processing module 240 may adjust the second portion of the bits using the adjustment parameter and merge the first portion of bits with the adjusted second portion of bits to obtain a decoded signal s, or LLRs useful for finding the decoded signal s. MLD module 230 may be or may include a lower-order decoder, e.g., a decoder configured to decode signals modulated using a modulation order that is lower than the modulation order of the received signal. MLD module 230 may be or may include a hard-decision MLD or a soft-decision MLD having a lower constellation order comparing to the constellation order of received signal Y. Using the reduced matrix may result in reduced complexity for performing estimation or calculation of the transmit signal s, comparing to estimation or calculation of the transmit signal s directly form of the received signal Y and the channel matrix H. According to some embodiments, MLD module 230 itself may implemented to use a decoder of an even lower constellation order comparing to the low constellation order of MLD module 230 and may include preprocessing module another MLD module and post processing block, as disclosed herein.

Figure 3:
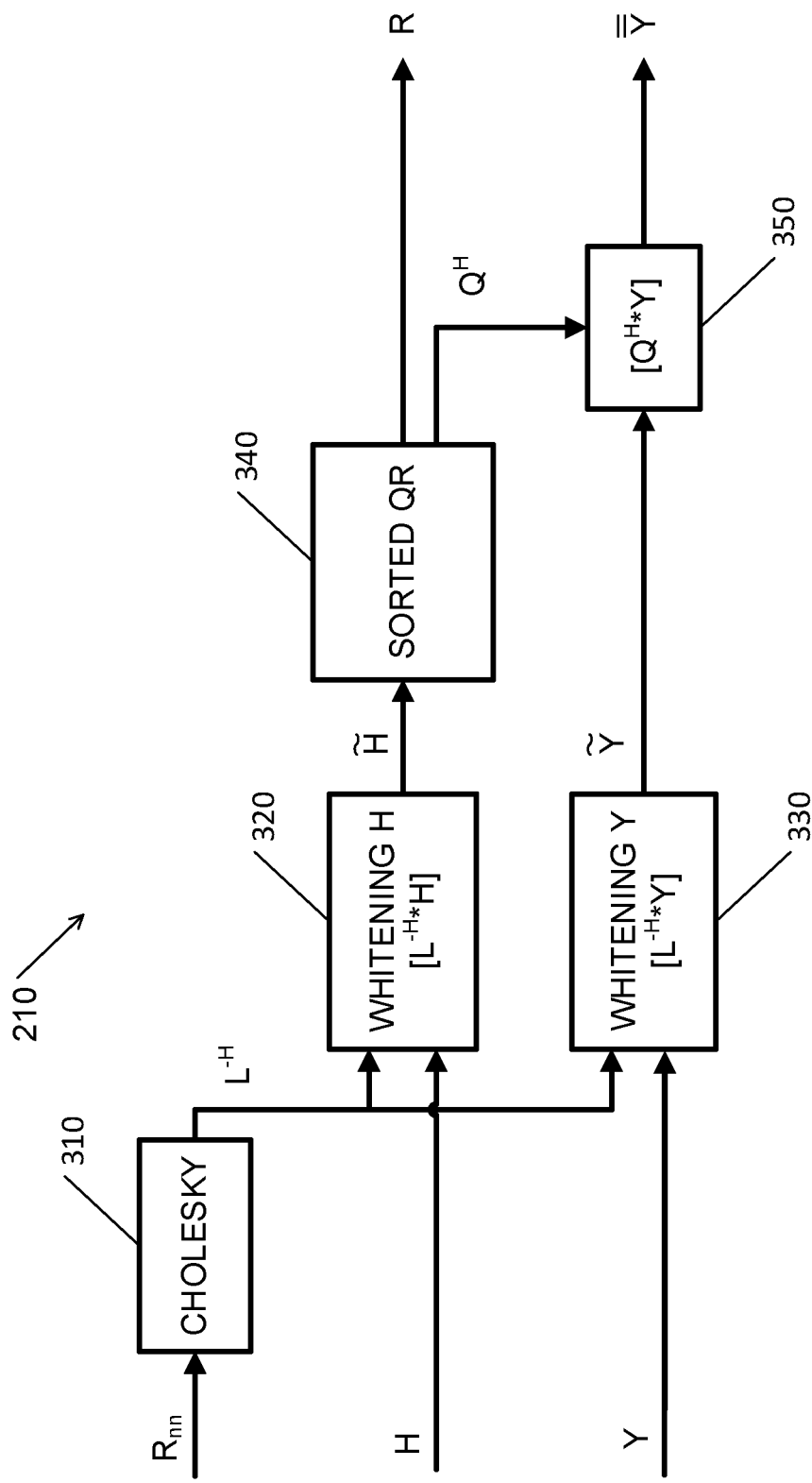
FIG. 3 is a schematic illustration of an example of a preparation module, according to embodiments of the invention.

Reference is now made to FIG. 3 which is a schematic illustration of an example of a preparation module 210, according to embodiments of the invention. In order to reduce the complexity of the receiver, noise whitening and sorted QR decomposition may be performed by preparation module 210. Noise whitening may include applying a whitening filter to the signal model. The whitening filter may be calculated using any whitening transform, for example in block 310 the noise correlation matrix $R_{nn}$ may be obtained and a whitening filter $L^{-H}$ may be calculated using a Cholesky decomposition of the noise correlation matrix $R_{nn}$, such that for example:

$$L^{H}*L = \text{Chol}(R_{nn}) \qquad \text{(Equation 3)}$$

The whitening filter may equal $L^{-H}$. Other whitening filters may be used. The whitening procedure may be performed by multiplying each component of the signal model by the whitening filter. After applying whitening filter $L^{-H}$, the new signal model is, for example:

$$\tilde{Y}=[L^{-H}Y=L^{-H}Hs+L^{-H}*n]=\tilde{H}s+\tilde{n} \quad \text{(Equation 4)}$$

Where $\tilde{Y}$ is the whitened received signal, $\tilde{H}$ is the whitened channel matrix, $\tilde{n}$ is the whitened noise where the whitened noise correlation matrix $R_{\tilde{n}\tilde{n}}$ becomes an identity matrix, according to the following example:

$$R_{\tilde{n}\tilde{n}}=\Sigma\tilde{n}\tilde{n}^H=L^{-H}(\Sigma nn^H)*L^{-1}=L^{-H}R^{nn}L^{-1}=I \quad \text{(Equation 5)}$$

According to embodiments of the invention, in block 320 the channel matrix H may be whitened using whitening filter $L^{-H}$ to obtain the whitened channel matrix H. For example, the channel matrix H may be whitened by applying the whitening filter $L^{-H}$ according to:

$$\tilde{H}=L^{-H}H \quad \text{(Equation 6)}$$

In block 330 the received signal Y may be whitened, using whitening filter $L^{-H}$ to obtain the whitened received signal $\tilde{Y}$. For example, the received signal Y may be whitened by applying the whitening filter $L^{-H}$ to the received signal Y according to:

$$\tilde{Y}=L^{-H}Y \quad \text{(Equation 7)}$$

Sorted QR decomposition may simplify the search distance computation. Using sorted QR decomposition, the whitened channel matrix $\tilde{H}$ is decomposed into matrices Q and R, such that:

$$\tilde{H}=Q_{N\times M}R_{M\times N} \quad \text{(Equation 8)}$$

$$R=Q^H\tilde{H} \quad \text{(Equation 9)}$$

$$\overline{Y}=Q^H\tilde{Y}=Q^H\tilde{H}s+Q^H\tilde{n}=Rs+\overline{n} \quad \text{(Equation 10)}$$

Where $\overline{n}$ has the same statistics (e.g., the same covariance matrix $E[n^H n]$) as n. $\overline{Y}$ may be referred to herein as the manipulated or modified input signal. Matrix Q is unitary such that: $Q^H Q=I$ or $Q^{-1}=Q^H$ and matrix R is a sorted upper triangular matrix (e.g., having real entries along its main diagonal):

$$\begin{bmatrix} r_{11} & \cdots & r_{1n} \\ 0 & r_{22} & r_{2n} \\ \vdots & \ddots & \vdots \\ 0 & 0 & r_{nn} \end{bmatrix}$$

It is evident from Equation 10 that after performing whitening and QR decomposition, the inputs for the MLD are $\overline{Y}$ and R.

Sorted QR requires performing QR decomposition jointly with layer sorting. When performing sorted QR decomposition, the elements along the main diagonal of R may be ordered in ascending order such that $r_{i,i} \leq r_{j,j}$ for i<j. The value of $r_{j,j}$ for each j may be relative to the signal to noise ratio (SNR) of the layer represented by that row. Thus, the rows of the sorted R matrix may be sorted such that the last row may have the highest power and the first row may have the lowest power. Therefore, if symbol detection is performed sequentially through the layers, specifically when using successive interference cancellation (SIC), reliable layers would be decoded first, and the probability of error propagation may decrease (relatively to not-sorted QR decomposition) because the SIC algorithm may start the decoding with the layer having the highest SNR among all the layers (the last row).

In block 340 a sorted QR decomposition may be performed on the whitened channel matrix $\tilde{H}$ to obtain matrices Q and R. In block 350 the whitened received signal $\tilde{Y}$ may be multiplied by $Q^H$ to obtain $\overline{Y}$ (the manipulated input signal). It should be readily understood by those skilled in the art that the modulation order of $\overline{Y}$ is the same as the modulation order of received signal Y and transmitted signals s. Thus, if the transmitted signals s is modulated by the higher-order QAM (e.g., 256 QAM), then received signal Y and $\overline{Y}$ are also modulated by the higher-order QAM.

Figure 4:
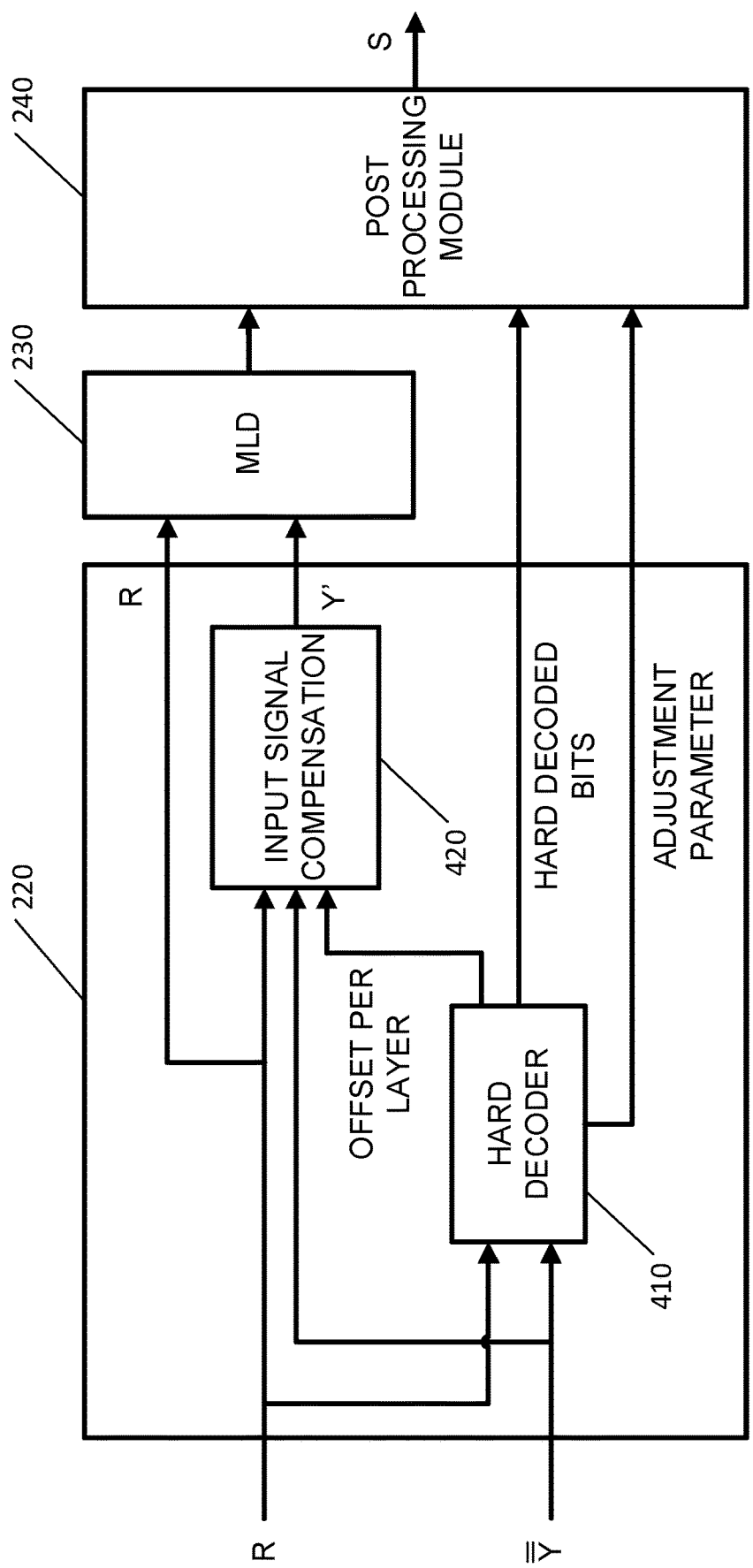
FIG. 4 is a schematic illustration of an example of a preprocessing module MLD module and a post processing module, according to embodiments of the invention.
Figure 5I:
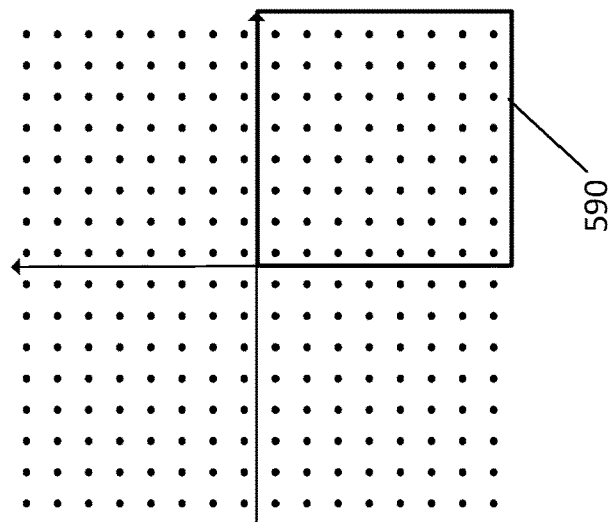
Figure 5H:
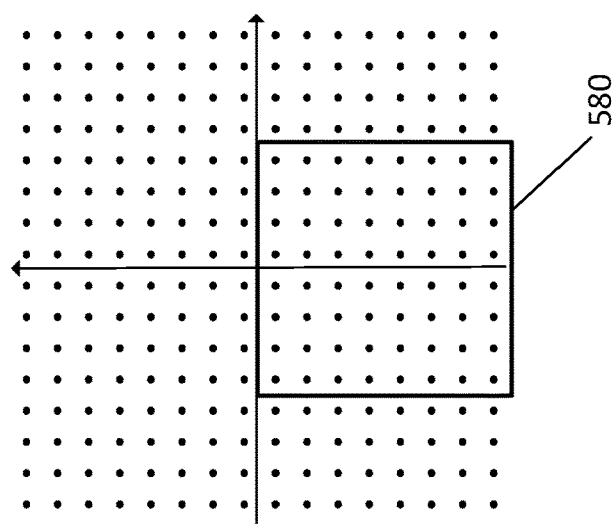
Figure 5G:
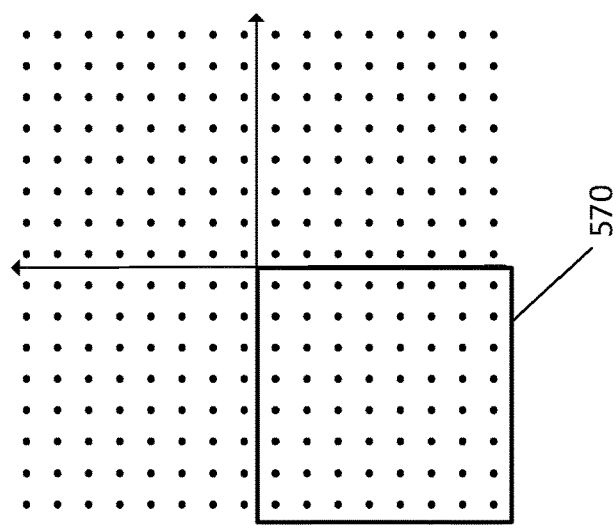

Reference is now made to FIG. 4 which is a schematic illustration of preprocessing module 220, an MLD module 230 and a post processing module 240, according to embodiments of the invention. Preprocessing module 220 may obtain R and $\overline{Y}$ from preparation module 210.

According to embodiments of the invention, hard decoder block 410 may find, estimate or determine a region in a constellation diagram of the of the higher-order QAM of $\overline{Y}$ for each layer of a received signal. The estimated region may include a portion of the constellation diagram of the higher-order QAM having the same size as the size of a constellation diagram of a lower-order QAM. Thus, for higher-order QAM with order (e.g., number of constellation points) of $m=4^q$ (q being a positive integer q≥2), the region may include a square with $l=4^p$ (p being a positive integer q>p≥1) constellation points. For example, if the higher-order QAM is 256 QAM, the estimated regions (a region for each layer) may include 8*8=64 constellation points, e.g., be in a size of a 64 QAM constellation diagram. It is noted that hard decoder block 410 may estimate a region for each layer and that the regions of the different layers may be different.

In estimating or determining a region for a layer, hard decoder block 410 may estimate the region in which it is most likely that the decoded symbol will be, without fully decoding the input signal. This may be achieved using various estimation methods as disclosed herein. The estimation methods may relay on the nature of Gray coding, which implies that some bits are constant across a region. According to some embodiments, the division of the higher-order constellation map into lower-order constellation maps, or the list of possible regions hard decoder block 410 may use, may be predetermined and constant. The possible regions may, when combined, cover the entire higher-order constellation map. In some embodiments, the possible regions may partially overlap. Overlapping regions may reduce the chances for an error in estimating determining the region in case of an input signal that is located next or in proximity of a border between two regions.

For example, each of FIGS. 5A-I depicts a region having a size of a 64 QAM constellation map on a 256 QAM constellation map, according to embodiments of the invention. The size of a 256 QAM constellation map is 16*16, e.g., the constellation points are arranged in sixteen rows by sixteen columns, and the size of a 64 QAM constellation map is 8*8, e.g., the constellation points are arranged in eight rows by eight columns as known in the art. Thus, each of FIGS. 5A-I depicts a constellation diagram of the higher-order QAM, e.g., 256 QAM and an example of a possible estimated region in size equal to a size of a constellation diagram of a lower-order QAM, e.g., 64 QAM. Thus, in this example, nine possible regions are defined. The nine possible regions, when combined, cover the entire 256 constellation diagram and partially overlap. For example, the estimated region depicted in FIG. 5A includes the upper left portion of 8*8 constellation points of the 256 QAM constellation map, the estimated region depicted in FIG. 5B includes the upper middle portion of 8*8 constellation points of the 256 QAM constellation map, etc. It can be seen in the example of FIGS. 5A-I that the regions may partially overlap. For example, the region in FIG. 5B partially overlaps with the regions in FIGS. 5A, 5C and 5D. Other possible estimated regions may be used.

In some embodiments, estimating or determining a region for each layer may include solving a channel equation using the sorted R matrix of the sorted QR decomposition, selecting a closest constellation point for each layer, and selecting the region based on the closest constellation point. According to embodiments of the invention, solving a channel equation, e.g., using the SIC detection algorithm, may include solving the channel equation while ignoring the noise component:

$$\bar{Y} = Rs \qquad \text{(Equation 11)}$$

Equation 11 may be solved in any applicable manner. For example, for 2*2 MIMO, the following equation may be solved:

$$\begin{bmatrix} y1 \\ y2 \end{bmatrix} = \begin{bmatrix} r11 & r12 \\ 0 & r22 \end{bmatrix} * \begin{bmatrix} x1 \\ x2 \end{bmatrix} \qquad \text{(Equation 12)}$$

Where $$\bar{Y} = \begin{bmatrix} y1 \\ y2 \end{bmatrix},$$

$$R = \begin{bmatrix} r11 & r12 \\ 0 & r22 \end{bmatrix}, \text{ and}$$

$$s = \begin{bmatrix} x1 \\ x2 \end{bmatrix}.$$

Solving equation 12 for the last (in this case the second) raw may include solving:

$$x2 = y2/r22 \qquad \text{(Equation 13)}$$

Where x2 may be the solution of Equation 13 for the second layer. Solving equation 12 for the first raw may include solving:

$$x1 = \frac{y1 - r12 * x2}{r11} \qquad \text{(Equation 14)}$$

Where x2 may be the solution of Equation 13 for the first layer. Since R is upper triangular and sorted, the probability of error propagation is decreased. The last raw of R, which is calculated first may have the highest SNR because R is sorted, and therefore, the probability of error in calculating x2 is minimal. x2 may also be used for solving the first raw as well. Therefore, minimizing the error in calculating x2 minimizes the error propagation.

Embodiments of the invention may include slicing the solutions of Equation 12, e.g., selecting a closest constellation point for each layer or the constellation point with the closest Euclidean distance (or other measure of distance) from the solution for each layer, for example using:

$$\bar{xi} = \text{SLICE}(xi) \qquad \text{(Equation 15)}$$

For example, selecting a closest constellation point for each layer for x1 and x2 may include:

$$\bar{x2} = \text{SLICE}(x2) \qquad \text{(Equation 16)}$$

$$\bar{x1} = \text{SLICE}(x1) \qquad \text{(Equation 17)}$$

Thus, if any of x1 and x2 do not fall exactly on a constellation point of the higher-order constellation map, the constellation point that is closest to each solution, e.g., in terms of Euclidean distance, may be selected for each layer.

Figure 6:
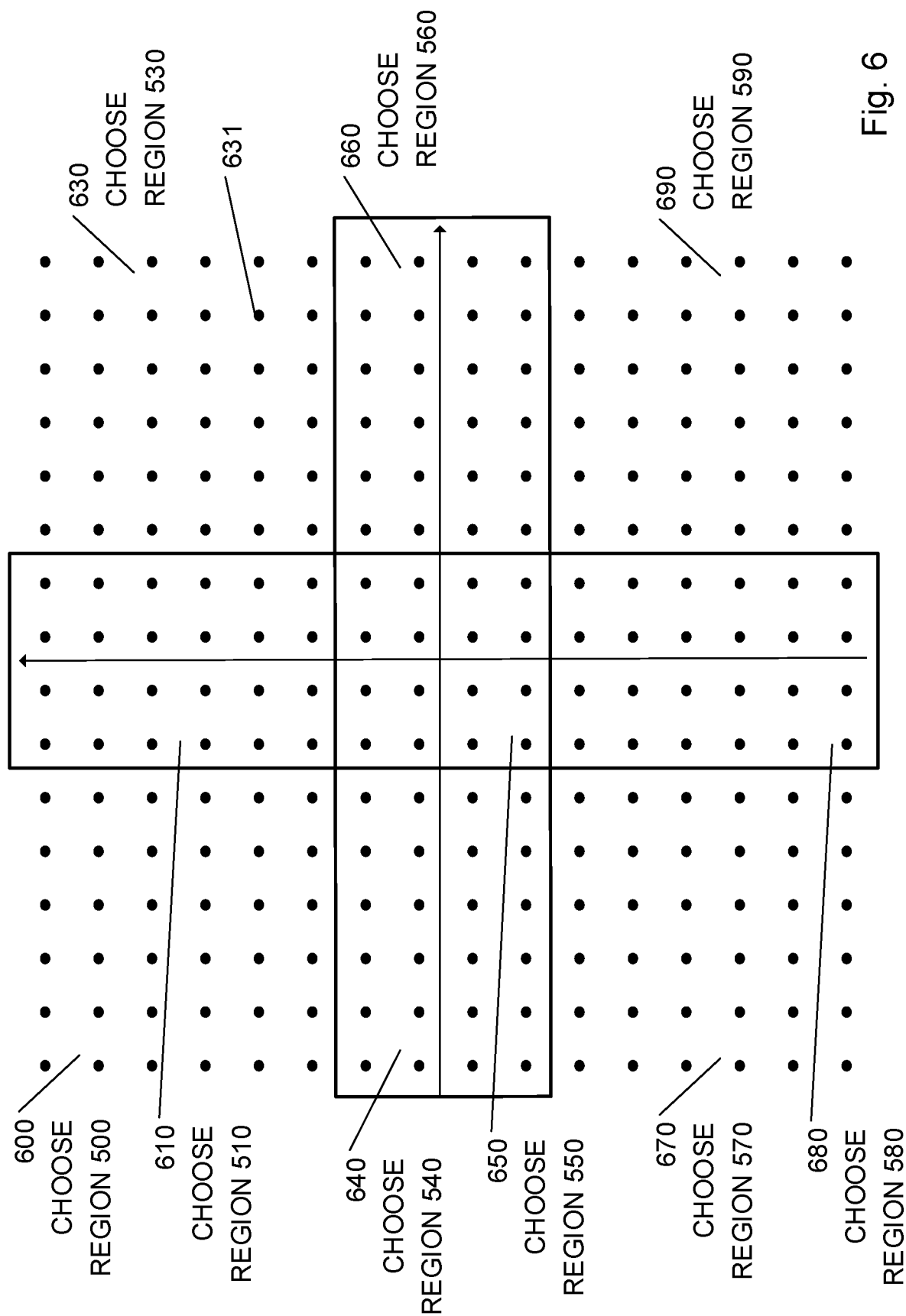
FIG. 6 presents an example of sections for a 256 QAM constellation map and associated regions, according to embodiments of the invention.

According to embodiments of the invention, a region may be selected for each layer based on the solution of Equation 12 or the closest constellation point for that layer. For example, the higher-order constellation map may be divided into sections, where each section may be associated with a region. According to some embodiments, the sections may not overlap. Thus, for each layer, the solution of Equation 12 or closest constellation point for that layer may be located in a single specific section, and the region that is associated with this section may be selected for this layer. FIG. 6 presents an example of sections for a 256 QAM constellation map and associated regions, according to embodiments of the invention. For example, if the sliced solution of a layer is in constellation point 631, which falls within section 630, then region 530 (shown in FIG. 5C) may be selected for that layer. Other methods for selecting a region for each solution may be used. For example, a center point may be calculated for each region, and a region with the closest center point e.g., in terms of Euclidian distance, to the solution of Equation 12 for each layer may be selected.

According to some embodiments, a region may be selected using machine learning (ML) algorithms, such as a neural network (NN) with a SoftMAX output layer that may obtain the input signal Y (or $\bar{Y}$) and R as inputs and be trained to choose the region based on Y (or $\bar{Y}$) and R. Using ML algorithms may be beneficial for supporting higher-constellation order m to lower-constellation order l ratios that are larger than 4, e.g., for example from 1024 QAM to 64 QAM.

According to some embodiments, hard decoder block 410 may further find or decode, for each layer, a first portion of bits of the decoded symbol based on bits that are constant among or across all constellation points located in the estimated region of the layer. In some embodiments, finding or decoding bits of a decoded symbol may include providing log likelihood ratios (LLRs) for each of the decoded bits.

As known in the art, the constellation points in QAM constellation maps are ordered using Gray coding. Each constellation point in the constellation map represents a series of bits, where each bit may be either logical '1' or logical '0'. Generally, Gray coding is used to minimize bit errors by causing adjacent bit series or sequences to only differ in exactly one bit (binary digit) from their neighbors. Based on the properties of Gray coding, a portion of the binary bit sequences in a selected region may be constant for all the binary bit sequences in the region. For example, for a higher-order QAM constellation order m, and a region size l, the number of constant bits c may equal:

$$\log_2 m - \log_2 l = c \qquad \text{(Equation 18)}$$

Thus, hard decoder block 410 may find or decode, for each layer, c bits (or provide LLR of the bits) of the decoded symbol, referred to herein as the hard decoded bits. The hard decoded bits may include the c bits that are constant among constellation points located in the estimated region of the layer.

For example, for a 256 QAM constellation, and a region size 64, the number of constant bits may equal:

$$\log_2 256 - \log_2 64 = 2 \qquad \text{(Equation 19)}$$

Therefore, if the high-order constellation is 256 QAM and the region size 64, the number of constant bits may equal 2. It is noted, that for each region, the value and location of the constant bits in the bit sequence may be different and unique for that region. The value and location of the constant bits in the bit sequence in each region may be determined according to the Gray code used for assigning bit values the constellation points. Thus, given a region, hard decoder block 410 may know the value and location of the constant bits in the bit sequence in the selected region.

FIG. 7 presents bit values that are assigned to each constellation point in region 510 in a typical 256 QAM constellation, and the hard decoded bits in region 510, according to embodiments of the invention. The upper four bits are the real part of the constellation point value and the lower four bits are the imaginary part of the constellation point value. The real and image are interleaved. For clarity, bits in the bit sequence will be marked as Y7, Y6, Y5, Y4, Y3, Y2, Y1, Y0, the Real bits (the top four bits of each constellation point in FIG. 6) are Y7, Y5, Y3, Y1 and Imaginary bits (the bottom four bits of each constellation point in FIG. 6) are Y6, Y4, Y2, Y0. Thus, for example, the most upper left constellation point is Real bits Y7, Y5, Y3, Y1=1111, Imaginary bits Y6, Y4, Y2, Y0=0111, which constructs the bit sequence of 10111111, which equals 191 in decimal.

As can be seen in FIG. 7, the constant bits in region 510 may be Y7='1' and Y6='0', marked as box 710, and in region 520 Y5='0' and Y6='1', marked as boxes 720. The example presented in FIG. 7 is based on LTE and 5G gray code mapping. However, this is not limiting and embodiments of the invention may be performed with any gray code mapping, with the required adjustments.

According to some embodiments, hard decoder block 410 may calculate, select or provide a region offset and an adjustment parameter for each layer. The region offset may be a parameter specific to each region, that may be used for adjusting $\overline{Y}$, as disclosed herein. The region offset of a region may be the distance, e.g., the Euclidian distance, of the center of the region from the center of the grid of the constellation map. The region offset of each layer may be calculated or selected by hard decoder block 410 according to the selected region of the layer, e.g., as the distance of the selected region of the layer from the center of the constellation map. A region offset for each layer may be provided by hard decoder block 410 to input signal compensation block 420. The adjustment parameter may be a parameter specific to each region, or a region indicator, that may be used for adjusting the result of MLD block 230 for each layer according to the selected region for that layer, as disclosed herein. In some embodiments, the region offset may be calculated offline for each region and stored, e.g., in a table. Thus, once the region is known, the region offset may be retrieved from the table. For example, Table 1 presents a partial table for associating regions region offset for 256 higher-order QAM and 64 lower-order QAM. Thus, if the region is 530 (FIG. 5C) then the region offset may equal 8+j8. Similarly, the adjustment parameter may be stored, in a table as well.

TABLE 1

Partial table for associating regions with a region offset for 256 higher-order QAM and 64 lower-order QAM.

| Region Indicator | Region Offset |
|---|---|
| 510 | −8 + j8 |
| 520 | 0 + j8 |
| 530 | 8 + j8 |
| 540 | −8 + 0j |
| 550 | 0 + 0j |
| 560 | 8 + 0j |
| 570 | −8 − j8 |
| 580 | 0 − j8 |
| 590 | 8 − j8 |

According to some embodiments, input signal compensation block 420 may obtain the input signal Y, or manipulated input signal $\overline{Y}$, the R matrix and the region offset for each layer. Input signal compensation block 420 may offset the received signal using the region offset, using for example:

$$Y\_\text{offset} = \overline{Y} - R * \text{region\_offset\_vector} \qquad \text{(Equation 20)}$$

Where region_offset_vector including the region offset of all layers.

MLD module 230 may obtain Y offset and R, and may determine, calculate or estimate the remaining bits (e.g., the bits not decoded by hard decoder block 410) of the transmit signal s, e.g., provide LLRs for each of the decoded bits. MLD module 230 may be or may include a lower-order QAM decoder, implemented using a hard-decision MLD or a soft-decision MLD.

Embodiments of the invention may be used hierarchically. For example, MLD block 230 itself may be implemented by using a lower-order QAM decoder for performing higher-order QAM decoding. Thus, for example, a 1024 QAM modulated input signal may be divided to regions having a size of 256 constellations points and decoded using a MLD block 230 fitted for decoding 256 QAM signals. However, the MLD block 230 fitted for decoding 256 QAM signals may be implemented by dividing the 256 constellation maps into regions of 64 constellations points decoded using a MLD block 230 fitted for decoding 64 QAM signals.

Post processing module 240 may obtain the hard decoded bits and the adjustment parameter for each layer from hard decoder block 410, and the remaining bits decoded by MLD module 230. Post processing module 240 may adjust the remaining bits decoded by MLD module 230 and merge the hard decoded bits with the remaining bits based on the region of the layer (e.g., based on the adjustment parameter or region indicator). For example, post processing module 240 may order or locate the hard decoded bits and the LLRs or soft decoded bits in the right location according to the adjustment parameter or region indicator.

Adjusting the remaining bits decoded by MLD module 230 may include changing, e.g., inverting values of bits, if required, to adjust for the region shifting. Since a lower-order QAM decoder is used by block 230, the lower-order QAM decoder (or MLD block 230) is ignorant to the region of the higher-order QAM. Thus, the lower-order QAM decoder decodes the signal as if the constellation map is centered along the real and imaginary axes thus, specific bit values may not fit the real region.

Merging the hard decoded bits with the remaining bits may include placing the hard decoded bits in the correct location within the bit sequence. For example, since the location of the hard decoded bits within the symbol bit sequence is known for each region, post processing module 240 may include a table associating each region (or adjustment parameter) with a specific location of the hard decoded bits. Thus, post processing module 240 may use adjustment parameter the retrieve the location of the hard decoded bits and place the hard decoded bits in the appropriate locations. For example, Table 2 presents a partial table for associating regions with the location of the hard decoded bits for 256 higher-order QAM and 64 lower-order QAM. The example presented in Table 2 is based on LTE and 5G gray code mapping. However, this is not limiting, and embodiments of the invention may be performed with any gray code mapping, with the required adjustments. Thus, if the adjustment parameter or region indicator indicates region 510 (FIG. 5A) then the location of the hard decoded bits may be Y7 and Y3. Thus, if the bits decoded by MLD module 230 are marked X5, X4, X3, X2, X1, X0, then the final bit sequence after merging would become Y7, X5, X4, X3, Y3, X2, X1, X0.

TABLE 2

An example table for associating regions withthe location of the hard decoded bits for 256 higher-order QAM and 64 lower-order QAM.

| Region Indicator | Locations |
| --- | --- |
| 510 | Y7, Y6 |
| 520 | Y5, Y6 |
| 530 | Y7, Y6 |
| 540 | Y7, Y4 |
| 550 | Y5, Y4 |
| 560 | Y7, Y4 |
| 570 | Y7, Y6 |
| 580 | Y5, Y6 |
| 590 | Y7, Y6 |

Figure 8A:
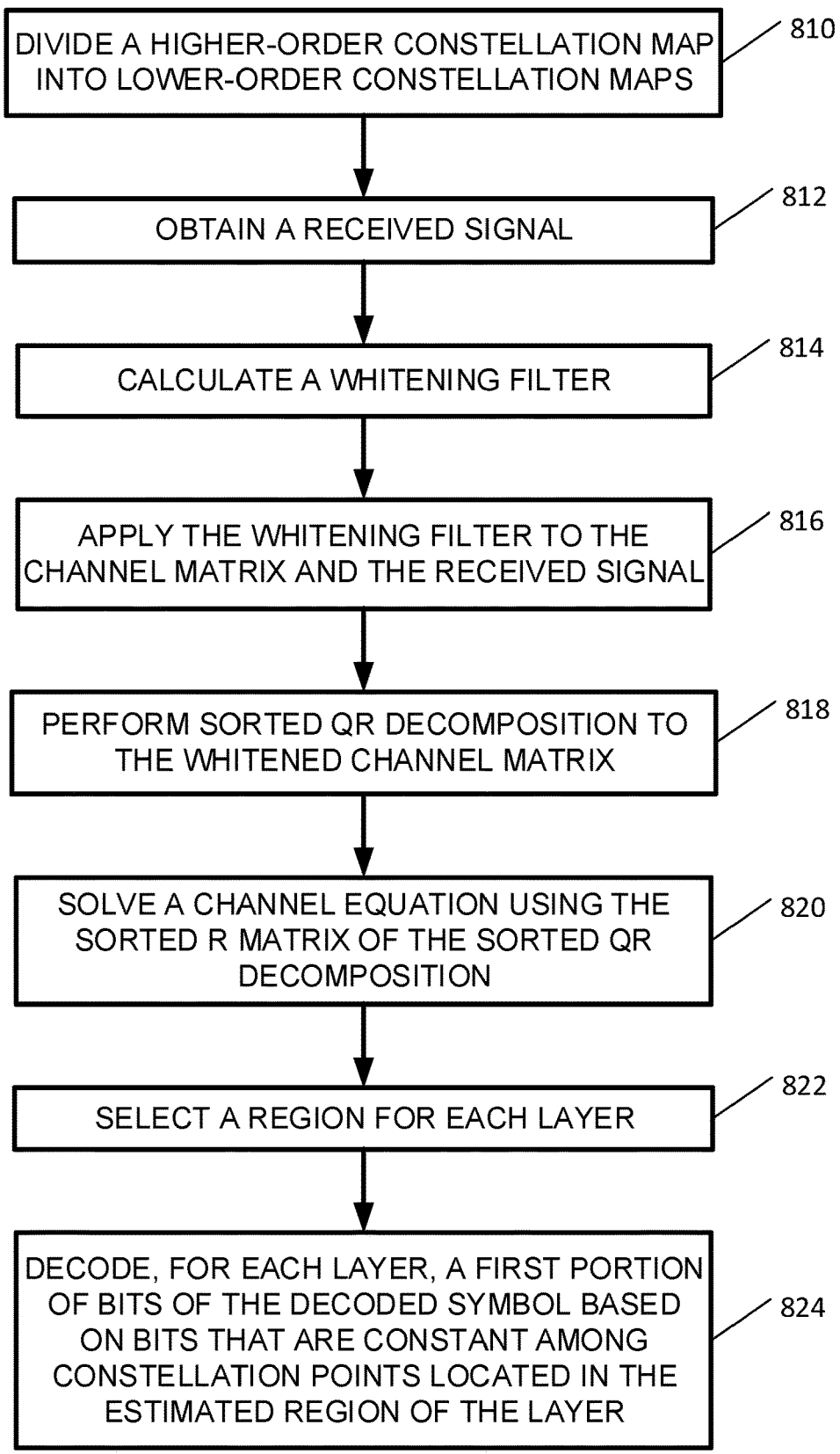
FIG. 8A is a first part of a high-level flowchart illustrating a method for performing a higher-order quadrature amplitude modulation (QAM) decoding using a lower-order QAM decoder, according to embodiments of the invention.
Figure 8B:
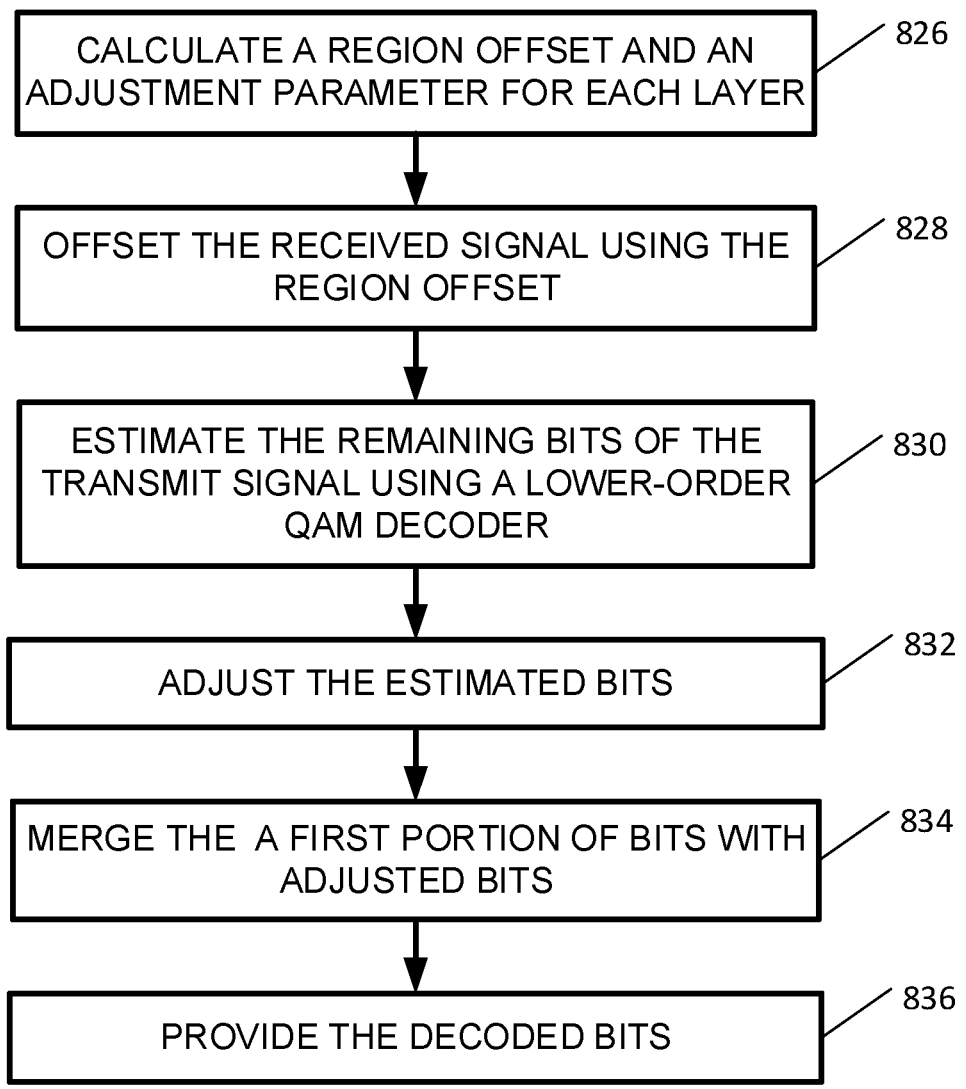
FIG. 8B is a second part of a high-level flowchart illustrating a method for performing a higher-order quadrature amplitude modulation (QAM) decoding using a lower-order QAM decoder, according to embodiments of the invention.

Reference is made to FIGS. 8A and 8B which are two parts of a high-level flowchart illustrating a method for performing a higher-order quadrature amplitude modulation (QAM) decoding using a lower-order QAM decoder, according to embodiments of the invention. An embodiment of the method for performing a higher-order quadrature amplitude modulation (QAM) decoding using a lower-order QAM decoder may be performed, for example, by decoder 106 shown in FIG. 1, by processor 1210, or by systems shown in FIGS. 2-4 and 9.

In operation 810, a higher-order constellation map may be divided into regions having a size that is equal to a size of a constellation diagram of lower-order constellation. The regions, when combined, may cover the entire higher-order constellation map and may partially overlap. For example, a higher-order 256 QAM, having 256 constellation points, may be divided into partially overlapping regions, each having a size of a 64 QAM constellation diagram and having 64 constellation points, e.g., as depicted in FIGS. 5A-5F.

In operation 812, a received signal Y, a channel matrix H corresponding to signal Y, and a vector of noise samples n may be received or obtained, e.g., by decoder 106. In operation 814, a whitening filter $L^{-H}$ may be calculated based on the vector of noise samples n. For example, a whitening filter $L^{-H}$ may be calculated by calculating a correlation matrix $R_{nn}$ of the vector of noise samples n as presented in Equation 2, and performing Cholesky decomposition of the noise correlation matrix $R_{nn}$, as presented in Equation 3. In operation 816, the channel matrix H and the received signal Y may be whitened, e.g., by applying the whitening filter $L^{-H}$ to the channel matrix H to obtain a whitened channel matrix $\tilde{H}$, e.g., as expressed in example Equation 6, and by applying the whitening filter $L^{-H}$ to the received signal Y, e.g., as expressed in example Equation 7.

In operation 818, a sorted QR decomposition may be performed to the whitened channel matrix $\tilde{H}$, to obtain sorted triangular matrix R and unitary matrix Q of the QR decomposition of the whitened channel matrix $\tilde{H}$ e.g., as expressed in example Equations 8 and 9, and the modified received signal $\tilde{Y}$, e.g., as expressed in example Equation 10. In operation 820, the channel equation, e.g., equation 11, may be solved using the sorted R matrix of the sorted QR decomposition, and a constellation point closest to the solution of the channel equation may be selected for each layer. In operation 822, a region may be selected for each layer based on the solution of the channel equation or based on the closest constellation point for that layer. For example, the higher-order constellation map may be divided into non-overlapping sections, where each section may be associated with a region. For each layer, the solution of the channel equation or the closest constellation point for that layer may be located in a single specific section, and the region that is associated with this section may be selected for this layer.

In operation 824, a first portion of bits of the decoded symbol may be discovered, estimated or decoded, e.g., the bits that are constant among or across all constellation points located in the estimated region of the layer may be decoded. In operation 826, a region offset and an adjustment parameter may be calculated selected or obtained for each layer. A region offset of a region may be a distance, e.g., Euclidian distance, of the center of the region from the center of the constellation map. The adjustment parameter may be a parameter specific to each region. Both the region offset and the adjustment parameter may be calculated offline for each region and selected during operation for each layer according to the selected region of the layer.

In operation 828, the received signal may be offset according to the region offset, using for example, Equation 20. In operation 830, the remaining bits of the transmit signal s may be estimated or decoded (e.g., LLRs may be provided) using a lower-order QAM decoder. In operation 832, the remaining bits decoded in operation 830 may be adjusted using the adjustment parameter. Adjusting the bits decoded in operation 830 may include changing, e.g., inverting values of bits, if required, to adjust or account for the region shifting. In operation 834, the bits decoded in operations 824 and 830, and adjusted in operation 832, may be merged. For example, each of the bits obtained in operations 824 and 832 may be placed in the right location according to the adjustment parameter or region indicator. Thus, a decoded received signal, e.g., an estimation of the transmitted signal s may be obtained. The estimation of the transmitted signal s may be provided to other blocks in a MIMO receiver for further processing.

Figure 9:
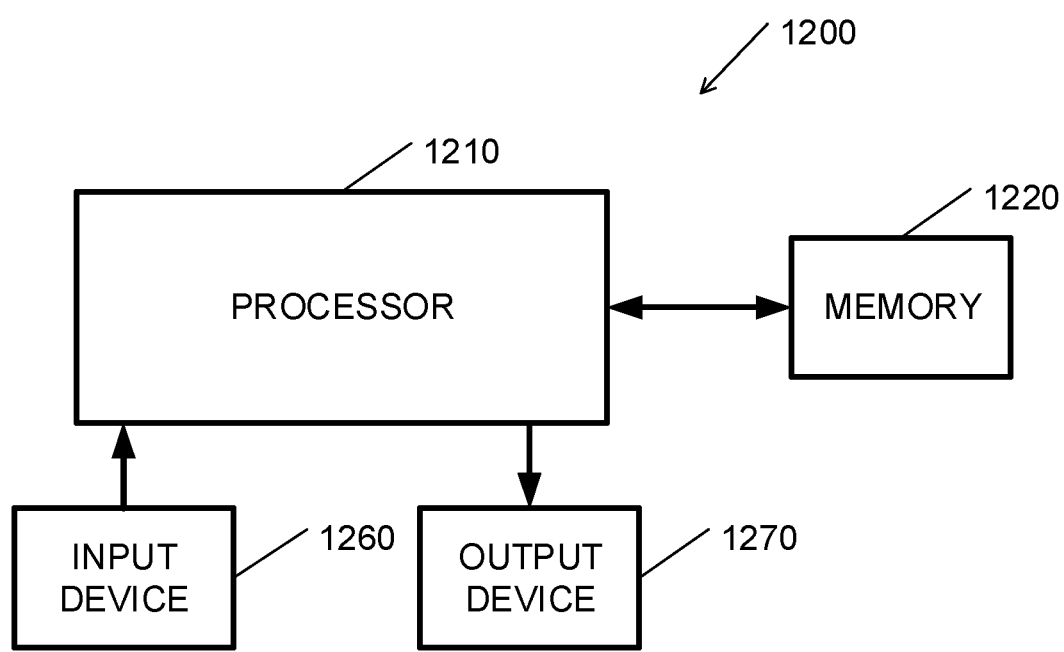
FIG. 9 is a schematic illustration of an exemplary device according to embodiments of the invention, according to embodiments of the invention; and It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Reference is made to FIG. 9, which is a schematic illustration of an exemplary device according to embodiments of the invention. A device 1200 may include a computer device having a wireless communication capabilities, including for example, a MIMO decoder, e.g., MIMO decoder 106 located in a UE, a smartphone, a cellular telephone or communications device, a cellular telephone, etc. Device 1200 may include any device capable of executing a series of instructions, for example for performing the methods disclosed herein. Device 1200 may include an input device 1260 such as a mouse, a receiver, a keyboard, a microphone, a camera, a Universal Serial Bus (USB) port, a compact-disk (CD) reader, any type of Bluetooth input device, etc., and an output device 1270, for example, a transmitter or a monitor, projector, screen, printer, speakers, or display.

Device 1200 may include a processor 1210. Processor 1210 may include or may be a vector processor, a central processing unit (CPU), a digital signal processor (DSP), a microprocessor, a controller, a chip, a microchip, a field-programmable gate array (FPGA), an application-specific integrated circuit (ASIC) or any other integrated circuit (IC), or any other suitable multi-purpose or specific processor or controller.

Device 1200 may include a memory unit 1220. Memory unit 1220 may be or may include any of a short-term memory unit and/or a long-term memory unit. Memory unit 1220 may include, for example, random access memory (RAM), dynamic RAM (DRAM), flash memory, volatile memory, non-volatile memory, a tightly-coupled memory (TCM), a buffer, a cache, such as an L-1 cache and/or an L-2 cache, or other suitable memory units or storage units. Memory unit 1220 may be implemented as separate (for example, "off-chip") or integrated (for example, "on-chip") memory unit, or as both.

Processor 1210 may request, retrieve, and process data from memory unit 1220 and may control, in general, the pipeline flow of operations or instructions executed on the data. Processor 1210 may receive instructions, for example, from a program memory (for example, in memory unit 1220 to perform methods disclosed herein. According to embodiments of the present invention, processor 1210 may decode a received signal in a MIMO communication system including performing a higher-order QAM decoding using a lower-order QAM decoder, as disclosed herein.

Embodiments of the invention may be implemented for example on an integrated circuit (IC), for example, by constructing processor 1210, as well as other components of FIG. 9 in an integrated chip or as a part of a chip, such as an ASIC, an FPGA, a CPU, a DSP, a microprocessor, a controller, a chip, a microchip, a system on a chip (Soc), etc. and associated software.

According to embodiments of the present invention, some units e.g., processor 1210, as well as the other components of FIG. 9, may include logic, e.g., hardware components such as gates logic circuits and memory cells and software as known in the art, to perform embodiments of the invention as disclosed herein, and may be, at least partially, described in a hardware description language (HDL) design, written in Very High Speed Integrated Circuit (VHSIC) hardware description language (VHDL), Verilog HDL, or any other hardware description language. The HDL design may be synthesized using any synthesis engine such as SYNOPSYS® Design Compiler 2000.05 (DC00), BUILD-GATES® synthesis tool available from, inter alia, Cadence Design Systems, Inc. An ASIC or other integrated circuit may be fabricated using the HDL design to include the logic of processor 1210, as well as the other components of FIG. 9. The HDL design may be synthesized into a logic level representation, and then reduced to a physical device using compilation, layout and fabrication techniques, as known in the art.

Embodiments of the present invention may include a computer program application stored in non-volatile memory, non-transitory storage medium, or computer-readable storage medium (e.g., hard drive, flash memory, CD ROM, magnetic media, etc.), storing instructions that when executed by a processor (e.g., processor 1210) carry out embodiments of the invention. Processor 1210 may be configured to carry out embodiments described herein by for example executing software or instructions.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general-purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

The invention claimed is:

1. A method for performing a quadrature amplitude modulation (QAM) decoding of a received signal, the method comprising, using a processor:
for each layer of a received signal, finding a region in a first constellation diagram of the received signal, wherein the region comprises a portion of the first constellation diagram of the received signal, wherein the portion has a same size of a second constellation diagram, and wherein a first constellation order of the received signal is higher than a second constellation order of the second constellation diagram; and,
for each layer: finding a first portion of bits of a decoded symbol based on bits that are constant among constellation points located in the region of the layer;
decoding the received signal using a QAM decoder having the second constellation order to obtain a second portion of bits of the decoded symbol;
adjusting the second portion of bits based on the region of the layer; and merging the first portion of bits with the second portion of bits.

2. The method of claim 1, wherein the QAM decoder is a maximum likelihood decoder (MLD).

3. The method of claim 1, comprising:
prior to the decoding, offsetting the received signal, wherein the offset is determined based on the region.

4. The method of claim 1, wherein finding the region comprises performing hard decoding on the received signal based on the received signal and a channel matrix.

5. The method of claim 1, wherein finding the region comprises:
performing sorted QR decomposition of a channel matrix;
solving a channel equation using a sorted R matrix of the sorted QR decomposition;
selecting a closest constellation point for each layer; and
selecting the region based on the closest constellation point.

6. The method of claim 5, comprising prior to the decoding, adjusting the received signal by a multiplication of the sorted R matrix and a region offset determined based on the region.

7. The method of claim 1, wherein the first portion of bits comprise log likelihood ratios (LLRs) of the first portion of bits and the second portion of bits comprise LLRs of the second portion bits.

8. The method of claim 1, wherein the first constellation order is 256 and the constellation order is 64.

9. The method of claim 8, wherein a constellation diagram of the received signal is divided into nine overlapping squared regions of 8*8 constellation points.

10. A method for decoding an input signal modulated using quadrature amplitude modulation (QAM) having a first modulation order, by a QAM maximum likelihood decoder (MLD) having a second modulation order, the method comprising:
dividing a constellation diagram of the input signal into regions equal in size to the size of a constellation diagram of the QAM MLD, wherein the first modulation order is higher than the second modulation order, wherein the regions when combined cover an entire constellation diagram of the input signal, and wherein at least a portion of decoded bits is constant over each region;
performing sorted QR decomposition on a channel matrix;
solving a channel equation using an R matrix of the QR decomposition to find a region for each layer; and
for each layer:
selecting bits that are constant for all constellation points in the region of the layer;
offsetting the received signal based on the region of the layer;
determining the remaining bits using the QAM MLD;
adjusting the remaining bits based on the region of the layer; and
merging the bits that are constant with the adjusted bits.

11. The first QAM decoder of claim 1, wherein the second QAM decoder is a maximum likelihood decoder (MLD).

12. The first QAM decoder of claim 1, comprising: logic to offset the received signal, prior to the decoding, wherein the offset is determined based on the region.

13. The first QAM decoder of claim 1, the logic is configured to find the region by performing hard decoding on the received signal based on the received signal and a channel matrix.

14. The first QAM decoder of claim 1, wherein logic is configured to find the region by:
performing sorted QR decomposition of a channel matrix;
solving a channel equation using a sorted R matrix of the sorted QR decomposition; selecting a closest constellation point for each layer; and
selecting the region based on the closest constellation point.

15. The first QAM decoder of claim 14, comprising logic to adjust the received signal by a multiplication of the sorted R matrix and a region offset determined based on the region, prior to the decoding.

16. The first QAM decoder of claim 1, wherein the first portion of bits comprise log likelihood ratios (LLRs) of the first portion of bits and the second portion of bits comprise LLRs of the second portion bits.

17. The first QAM decoder of claim 1, wherein the first constellation order is 256 and the constellation order is 64.

18. The first QAM decoder of claim 17, wherein a constellation diagram of the received signal is divided into nine overlapping squared regions of 8*8 constellation points.

19. The method of claim 10, wherein the regions overlap.

20. A first quadrature amplitude modulation (QAM) decoder comprising:
logic to find, for each layer of a received signal, a region in a first constellation diagram of a received signal, wherein the region comprises a portion of the first constellation diagram of the received signal, wherein the portion has a same size of a second constellation diagram, and wherein a first constellation order of the received signal is higher than a second constellation order of the second constellation diagram; and,
for each layer:

logic to find a first portion of bits of a decoded symbol based on bits that are constant among constellation points located in the region of the layer;
a second QAM decoder having the second constellation order and configured to decode the received signal to obtain a second portion of bits of the decoded symbol;
logic to adjust the second portion of bits based on the region of the layer; and logic to merge the first portion of bits with the second portion of bits.

* * * * *